United States Patent [19]
Satou

[11] Patent Number: 4,857,962
[45] Date of Patent: Aug. 15, 1989

[54] MASKING DEVICE FOR USE IN PHOTOGRAPHIC PRINTING

[75] Inventor: Hiroyuki Satou, Kanagawa, Japan

[73] Assignee: Fuji Photo Film Co., Ltd., Kanagawa, Japan

[21] Appl. No.: 192,265

[22] Filed: May 10, 1988

[30] Foreign Application Priority Data

May 11, 1987 [JP] Japan .................................. 62-114299

[51] Int. Cl.$^4$ .......................... G03B 29/00; G03B 27/58
[52] U.S. Cl. .......................................... 355/29; 355/74
[58] Field of Search ................................. 355/27–29, 355/74

[56] References Cited

U.S. PATENT DOCUMENTS

| | | | |
|---|---|---|---|
| 3,737,227 | 6/1973 | Harter et al. | 355/74 |
| 4,218,133 | 8/1980 | Biedermann | 355/74 X |
| 4,320,965 | 3/1982 | Kimura et al. | 355/74 |
| 4,324,488 | 4/1982 | Anderson et al. | 355/74 |
| 4,325,630 | 4/1982 | Kimura et al. | 355/74 |
| 4,417,810 | 11/1983 | Ueda et al. | 355/74 |
| 4,479,713 | 10/1984 | Long | 355/74 |
| 4,568,180 | 2/1986 | Kogane | 355/74 |
| 4,583,837 | 4/1986 | Shiga | 355/74 X |
| 4,634,268 | 1/1987 | Kogane | 355/74 |
| 4,708,464 | 11/1987 | Otsuki et al. | 355/74 X |
| 4,754,308 | 6/1988 | Ozawa | 355/74 |
| 4,806,983 | 2/1989 | Satou | 355/29 |

Primary Examiner—Richard A. Wintercorn
Attorney, Agent, or Firm—Sughrue, Mion, Zinn, Macpeak & Seas

[57] ABSTRACT

A masking device for use in photographic printing, disposed between a photographic printing light source and a lengthwise sheet of photosensitive medium and adapted to define the printing area, the masking device having a pair of moving bases capable of moving in the widthwise direction of the photosensitive medium, a pair of widthwise-end mask members supported on the moving bases and moved in response to the movement of the moving bases so as to define the printing area in the widthwise direction of the photosensitive medium at the time of printing of a non-framed image, and a pair of auxiliary mask members mounted on the widthwise-end mask members and adapted to define the printing area in the widthwise direction of the photosensitive medium at the time of printing of a framed image. The printing area is defined by the widthwise-end mask members when a non-framed image is formed or its is defined by the auxiliary mask members when a framed image is formed.

17 Claims, 7 Drawing Sheets

MASKING DEVICE FOR USE IN PHOTOGRAPHIC PRINTING

BACKGROUND OF THE INVENTION

1. Field of the Invention

This invention relates to a masking device which determines the area of printing on a photosensitive medium while being interposed between a photographic printing light source and the photosensitive medium.

2. Related Art

In a photographic printing apparatus, an image on the negative film is printed on a photosensitive medium such as prints: a framed (with-border) print having a frame portion where no printing is effected, and a non-framed (borderless) print formed by printing the original image over the entire area of the print. It is therefore necessary to change masks that are adapted for these two types of print. It is therefore necessary to change masks that are adapted for these two types of print.

To cope with this problem, the inventor of the present invention has proposed, in U.S. patent application Ser. No. 123,455 filed on Nov. 20, 1987, now U.S. Pat. No. 4,806,983, issued Feb. 21, 1989 a masking device for use in a photographic printing apparatus free from need for changing masks for printing of non-framed and framed images.

In this device, a pair of moving bases are moved in the widthwise direction of a photosensitive medium in accordance with the size thereof, and auxiliary mask members supported on the moving bases are thereafter made to advance or retreat depending on whether the image is printed with a frame or without frame. That is, the area of printing of a non-framed or framed image is defined in the widthwise direction by the auxiliary mask members alone.

It is therefore necessary for this device to accurately move the auxiliary mask members to two positions: non-framed image printing position; and framed image printing position.

SUMMARY OF THE INVENTION

It is an object of the present invention to provide a photographic printing apparatus in which there is no need for changing masks for printing of non-framed and framed images, and in which the auxiliary members are moved only when a framed image is printed.

To this end, a masking device for use in photographic printing, disposed between a photographic printing light source and a lengthwise sheet of photosensitive medium and adapted to define the area of printing on the photosensitive medium, the masking device having: a pair of moving bases capable of moving in a first direction generally perpendicular to a second direction corresponding to the lengthwise direction of the photosensitive medium, the moving bases being capable of moving toward or away from each other; first mask members fixed to the pair of moving bases and moved together therewith so as to define the printing area in the first direction at the time of non-framed image printing over the entire area of the photosensitive medium; and auxiliary mask members mounted on the first mask members and projected therefrom so as to define the printing area in the first direction, the printing area being reduced so that a peripheral portion of the photosensitive medium is not subjected to printing when the auxiliary mask members are projected.

In the case of printing of a non-framed image, the moving bases are moved to define the printing area in the first direction by means of the first mask members. In the case of printing of a framed image, the auxiliary mask members are projected along with the movement of the moving bases, thereby defining the printing area in the first direction. If parallel-movement mechanisms are interposed between the auxiliary mask members and the first mask members, the auxiliary mask members can be moved while the parallelism of the ends of these members to the longitudinal axis of the photosensitive medium is maintained.

DESCRIPTION OF THE PREFERRED EMBODIMENT

Figure 1:
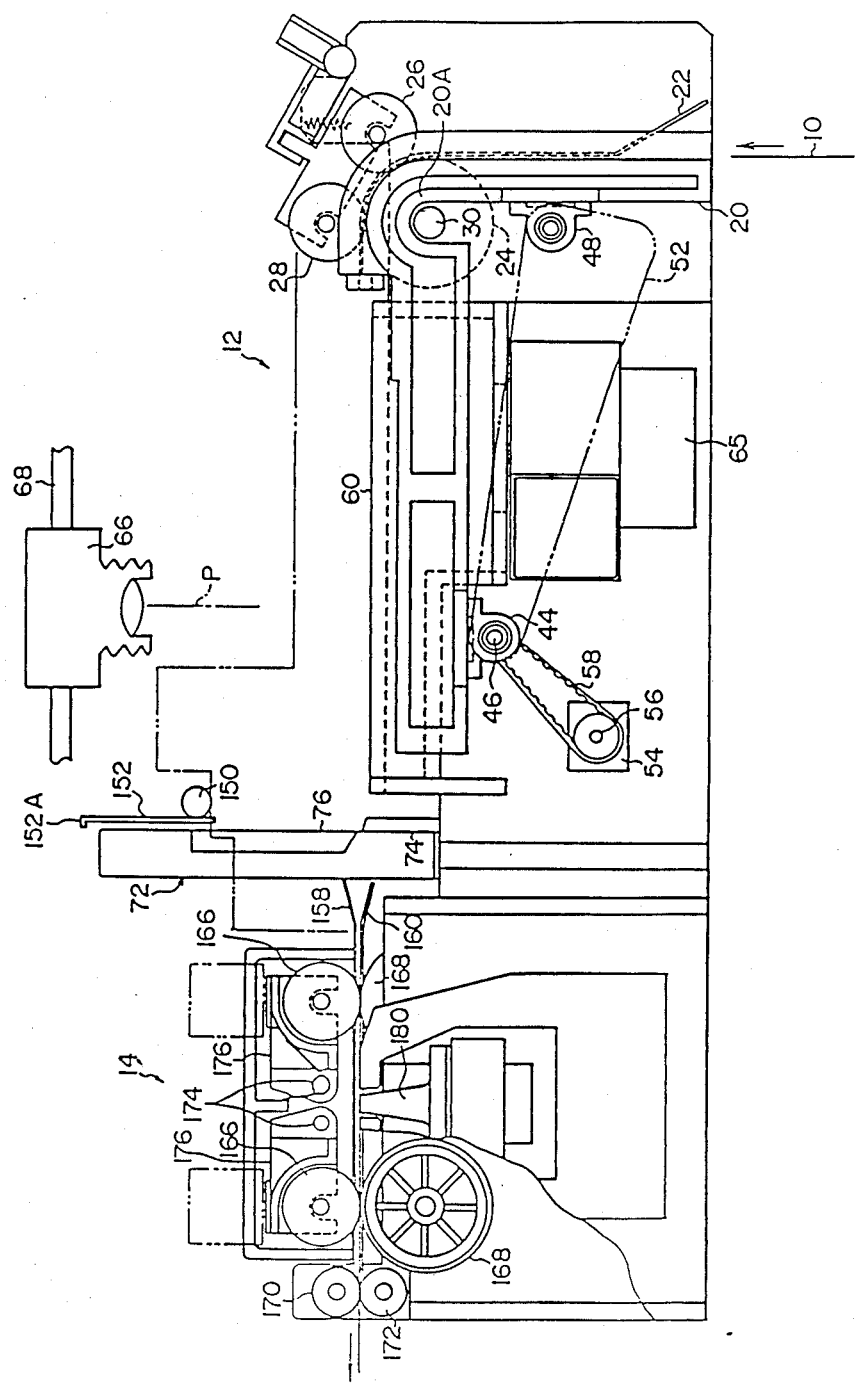
FIG. 1 is a longitudinal sectional view of a photographic printing apparatus to which the present invention is applied (a view of the state in which a support plate is removed)
Figure 2:
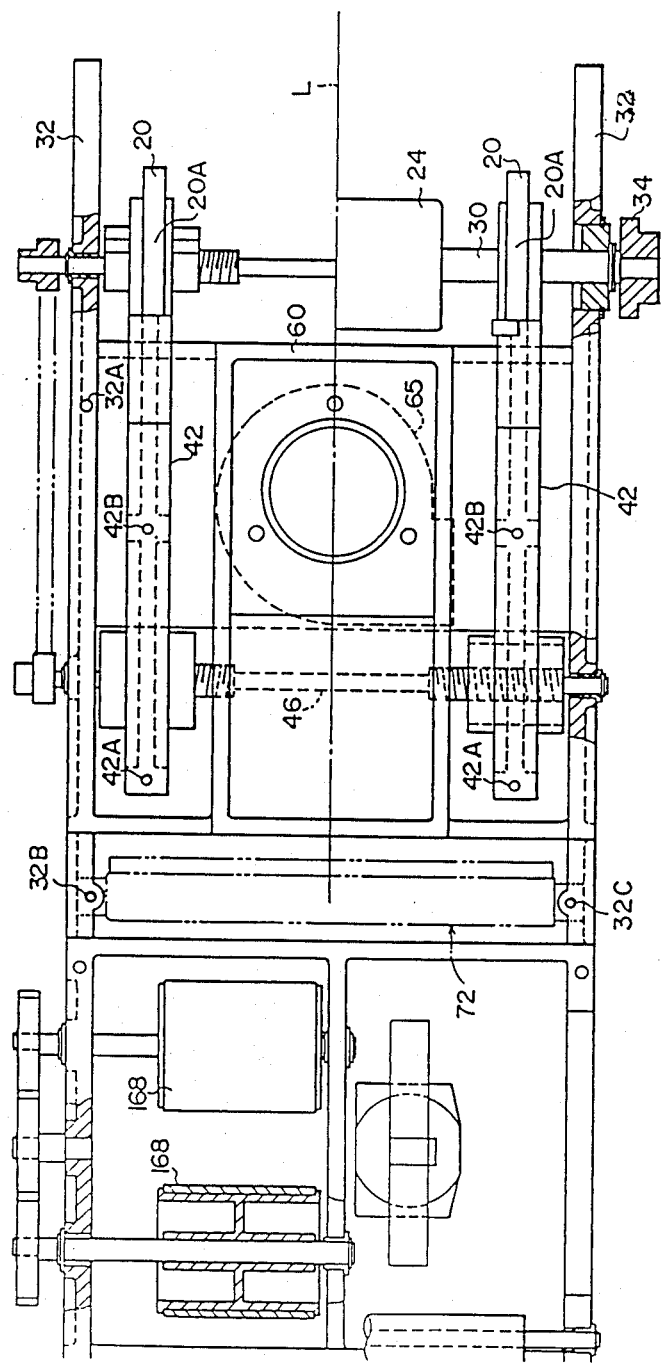
FIG. 2 is a plan view of the apparatus shown in FIG. 1.

FIGS. 1 to 5 show a photographic processing apparatus to which the present invention has been applied. In this photographic processing apparatus, a lengthwise print paper 10, which is a photosensitive medium, is sent to a development device (not shown) via a character-print section 14 after it has undergone printing in a printing section 12.

At the entrance of the printing section 12, a pair of longitudinal guide blocks are disposed on the opposite sides of a transportation center line L. The print paper 10 is transported upward between the longitudinal guide blocks 20 and guide plates 22 which face the guide blocks 20. The upper ends of the longitudinal guide blocks 20 are curved so as to form semicircles, and a guide roller 24, which has an outer peripheral configuration generally corresponding to the profile of these curved portions 20A, is disposed between the longitudinal guide blocks 20. Transporting rollers 26 and 28, which can be brought into contact with the guide roller 24, are adapted to make the print paper 10 advance in the horizontal direction while pinching it. Therefore, the center shaft 30 of the guide roller 24 is supported on a machine base 32 in the vicinity of its far ends, and a pulley 34 is fixed to an end of the shaft 30 protruding beyond the machine base 32 and is adapted to receive the rotational force of a motor (not shown).

Horizontal guide blocks 42 are integrally connected at their ends to the upper ends of the pair of longitudinal guide blocks 20. A pair of blocks 44 are fixed to the lower sides of the guide blocks 42, and a screw shaft 46 is screwed into the blocks 44. The screw shaft 46 has reversal screw portions screwed into the blocks 44, so that the pair of blocks 42 can be moved toward or away from each other when rotary members rotate, thereby changing the width the printing area.

Similarly, a pair of blocks 48 are fixed to the longitudinal guide blocks 20, and a screw shaft 50 is screwed into the blocks 48. A timing belt 52 is wound around the screw shafts 46 and 52, and the screw shaft 46 receives a rotational force of a motor 54 via a timing chain 58 stretched between the screw shaft 46 and an output shaft 56 of the motor 54. When the motor 54 rotates, the pair of horizontal guide blocks 42 are moved toward or away from each other along the axes of the screw shafts 46 and 50 while the parallelism between the horizontal guide blocks 42 are maintained.

The guide blocks 20 can move in the axial direction of the center shaft 30 without any interference therewith since upper ends of the guide blocks 20 are formed in such a manner that the curved portions 20A in the form of semicircles deviate from the center shaft 30.

A support table 60, on which the print paper 10 which is being supplied from the gap between the guide rollers 24 and the transporting rollers 28 in the horizontal direction is placed, is fixedly mounted on the machine base 32 in a position between the pair of horizontal guide blocks 42.

Figure 3:
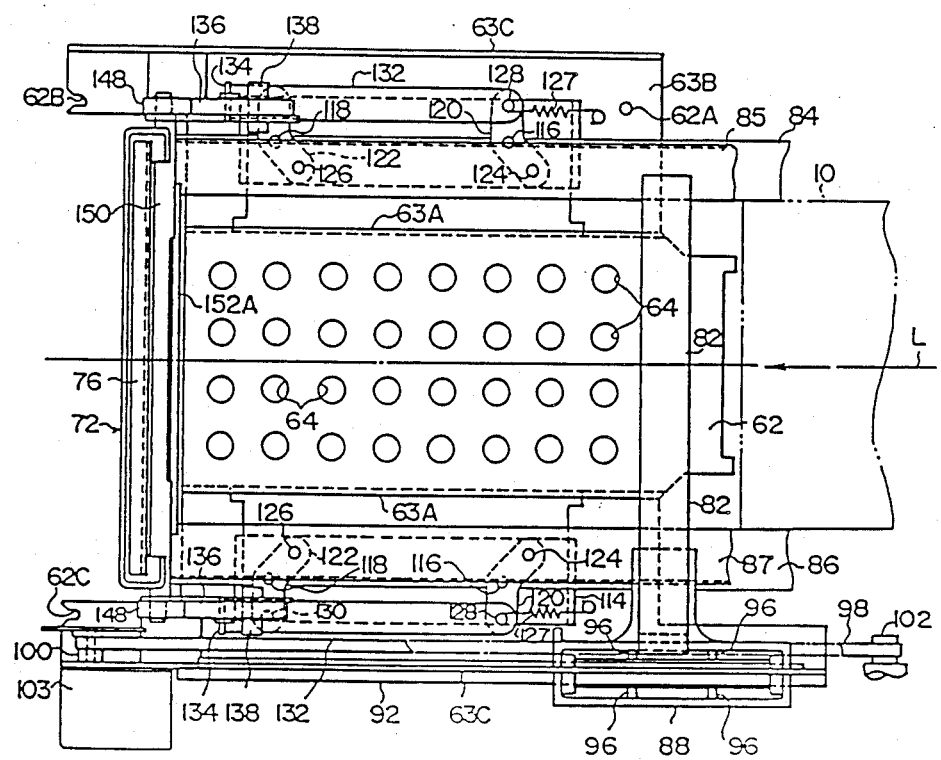
FIG. 3 is a plan view of a support plate.
Figure 5:
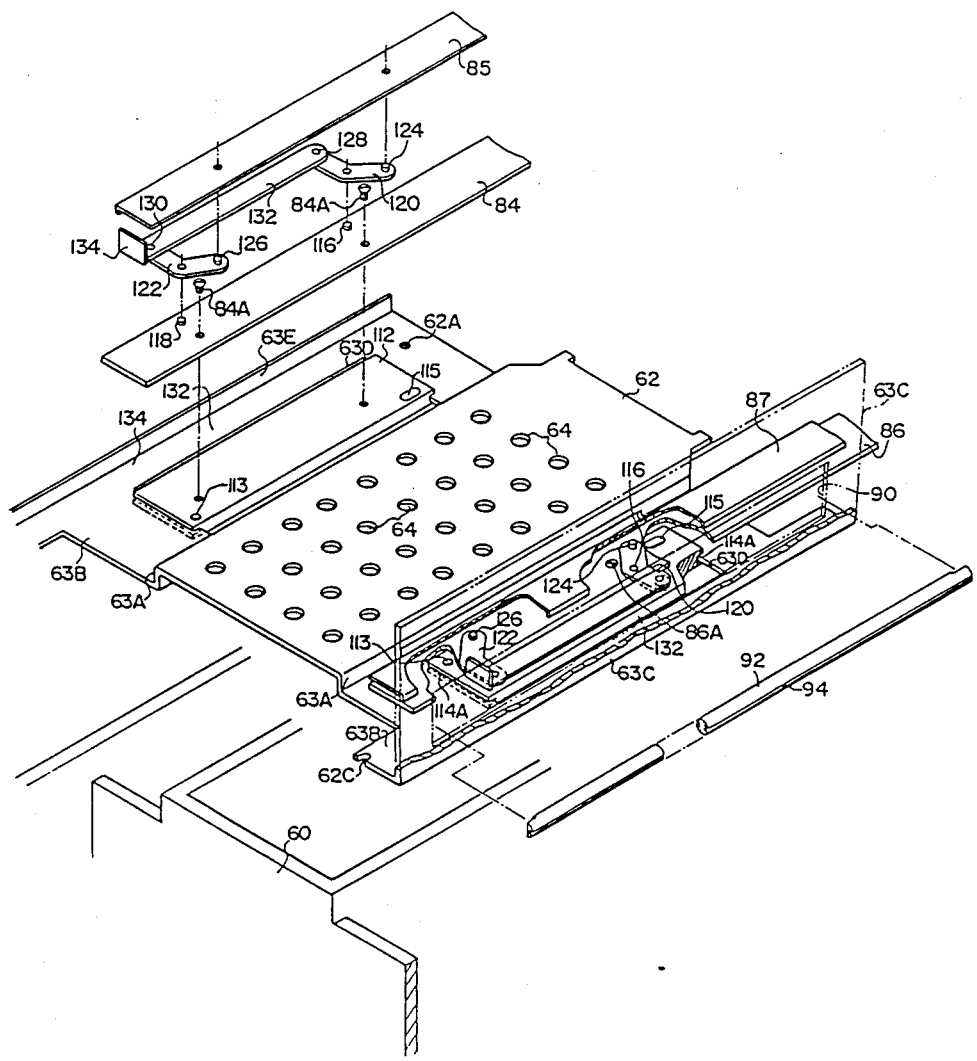
FIG. 5 is a perspective view of the support plate and related components.

A support plate 62 is placed on the support table 60, as shown in FIG. 5. The support plate 62 is formed by bending in such a manner that lower-level portions 63B are formed on the opposite sides of a central portion with step-wall portions 63A formed therebetween, and that vertically rising reinforcement portions 63C and 63E are formed at the widthwise outer ends of the lower-level portions 63B. As shown in FIG. 3, the support plate 62 has circular holes 62A formed in one of the lower-level portions 63B on the upstream side thereof relative to the direction in which the print paper 10 is transported, and notches 62B and 62C formed in the lower-level portions 63B on the downstream ends thereof. Pins 32A, 32B, and 32C (FIG. 2) which project from the machine base 32 are inserted into the circular hole 62A and the notches 62B and 62C, thereby positioning and mounting the support plate 62 on the machine base 32.

The support plate 62 also has a multiplicity of suction holes 64 in the surface on which the print paper 10 is placed, so that the print paper 10 can be drawn to the top surface of the support plate 62 by a drawing device 65 disposed inside the support table 60.

As shown in FIG. 1, an optical means 66, which incorporates a light source (not shown) and is disposed above the support plate 62, can move in the direction of the lengthwise axis of the print paper 10, that is, in the direction of the transportation center line L along a guide rail 68. Therefore, in the printing section 12, a printing optical axis P can be moved to the left or light as viewed in FIG. 1.

A cutter 72 is disposed between the printing section 12 and the character-print section 14 on the downstream side of the support plate 62 relative to the direction in which the print paper 10 is transported. The cutter 72 is constructed in such a manner that a stationary blade 74 is disposed under the path of the print paper 10 supplied from the printing section 12 in the horizontal direction while a moving blade 76 is disposed above this path, and that the print paper 10 is cut at a position between adjacent printed images as the moving blade 76 moves vertically. The cutter 72 forms one of longitudinal mask ends and can be adjusted so as to determine the printing area when the print paper 10 on the support plate 62 undergoes printing about the printing optical axis P.

Figure 4:
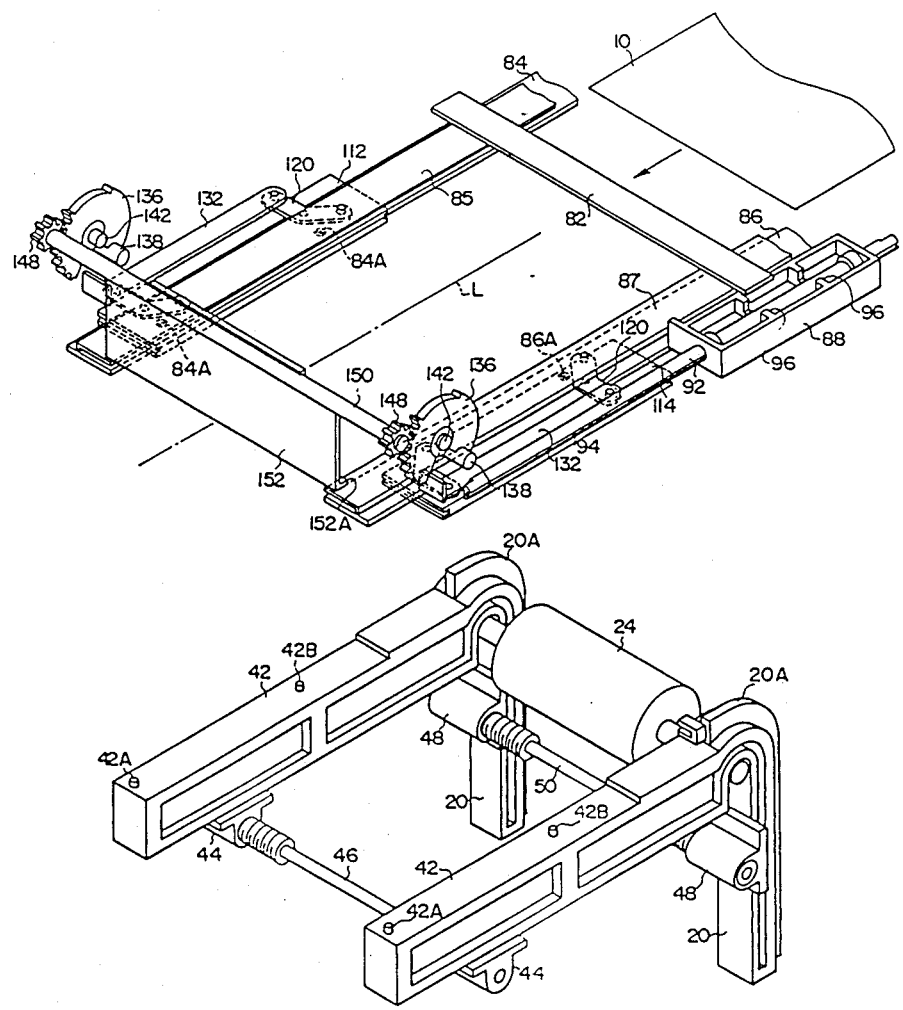
FIG. 4 is an exploded perspective view of a printing section in which the support plate is omitted.

A longitudinal-end mask member 82 for determining the other end of the printing area is disposed so as to face the moving blade 76 of the cutter 72, as shown in FIG. 4. Widthwise-end mask members 84 and 86 for determining the widthwise ends of the printing area are also provided. The area of printing about the printing optical axis P is determined by the longitudinal-end mask member 82, the moving blade 76 and the widthwise-end mask members 84 and 86.

The longitudinal-end mask member 82 is disposed in such a manner that the direction of its longitudinal axis is perpendicular to the transportation center line L, that is, corresponds to the widthwise direction of the print paper, and that its one end is fixed to a moving block 88 while its other end is placed on an auxiliary widthwise-end mask member 85 mounted on the widthwise-end mask member 84. The moving block 88 can be moved parallel to the lengthwise direction of the print paper 10 along a guide bar 92 which horizontally extends across an opening 90 (indicated by the double-dashed chain line in FIG. 5) formed in the reinforcement portion 63C. The moving guide block 88 has projections 96 (FIG. 3) which are formed inside the guide block 88 and are inserted into guide grooves 94 formed in the guide bar 92 in the longitudinal direction thereof, thereby enabling the moving block 88 and the longitudinal end mask member 82 to be linearly moved parallel to the transportation center line L.

As shown in FIG. 3, a portion of an endless timing belt 98 is attached to a portion of the moving block 88. The timing belt 98 is stretched between pulleys 100 and 102 which are axially supported on the reinforcement portion 63C so that an intermediate portion of the endless belt 98 becomes parallel to the guide bar 92. The pulley 100 reciprocatively moves the timing belt 98 when it is driven by a motor 103 fixed to the reinforcement portion 63C, thereby enabling the longitudinal-end mask member 82 to be moved toward or away from the cutter 72.

The optical means 66 is also moved in response to the movement of the longitudinal-end mask member 82. The optical means 66 is moved along the guide rail 68 to a middle point of the printing range defined by the longitudinal-end mask member 82 and the cutter 72.

The widthwise-end mask members 84 and 86 are respectively fixed to the moving bases 112 and 114 by bases 84A and 86B and are supported by moving bases 112 and 114 on the lower-level portions 63B of the support plate 62.

The moving bases 112 and 114 are attached to rectangular apertures 63D formed in the lower-level portions 63B of the support plate 62 so as to be able to move toward or away from the transportation center line L. Correspondingly, substantially U-shaped grooves 112A and 114A are formed at the far ends of the moving bases 112 and 114 (FIG. 4), and edges of the rectangular apertures 63D are fitted into these grooves.

Part of each rectangular aperture 63D extends to the step-wall portion 63A, and the width of the aperture is increased.

Each of the moving bases 112 and 114 has a circular hole 113 and an elongated hole 115 which accommodate a pair of pins 42A and 42B (FIG. 2) which vertically project from corresponding horizontal guide block 42. Consequently, the moving bases 112 and 114 are driven together with the horizontal guide blocks 42 in the direction perpendicular to the transportation center line L and are moved relative to the support plate 62 when the size of an image to be printed is changed.

The auxiliary widthwise-end mask member 85 and an auxiliary widthwise-end mask member 87 are mounted on the auxiliary widthwise-end mask members 84 and 86, respectively. The auxiliary widthwise-end mask members 85 and 87 can be moved toward or away from the transportation center line L together with the widthwise-end mask members 84 and 86.

The structure which supports the auxiliary widthwise-end mask member 85 on the widthwise-end mask member 84 and the structure which supports the auxiliary widthwise-end mask member 87 on the widthwise-end mask member 86 are symmetrical about the transportation center line L. Therefore, only the former will be described hereinafter.

As shown in FIGS. 4 and 5, a pair of pins 116 and 118 vertically project from the widthwise-end mask member 84 moving, and intermediate portions of link members 120 and 122 are axially supported by the pins 116 and 118. The auxiliary widthwise-end mask member 85 is axially supported by pins 124 and 126 which vertically project from ends of the link members 120 and 122, respectively. The distance between the pins 118 and 126 is equal to the distance between the pins 116 and 124, and the distance between the pins 124 and 126 is equal to the distance between the pins 116 and 118. Therefore, the axes of the pins 116, 118, 124, and 126 correspond to the vertexes of a parallelogram, and the widthwise-end mask member 84 supports the auxiliary widthwise-end mask member 85 through a parallel-displacement link mechanism and enables the auxiliary widthwise-end mask member 85 to move toward or away from the transportation center line L while maintaining the parallelism with this line.

Figure 6:
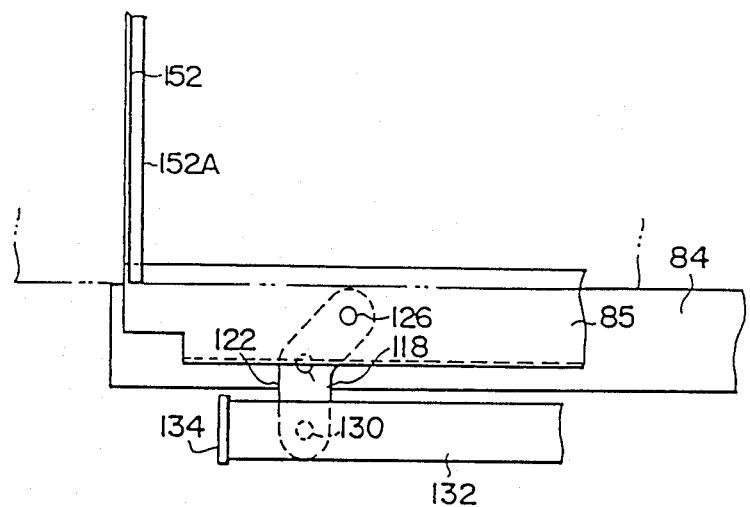
FIG. 6 is a plan view of one of widthwise-end mask members and related parts.
Figure 7:
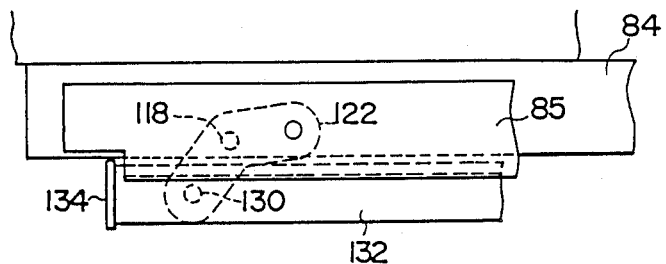
FIG. 7 is an illustration of the operation of the parts shown in FIG. 6.

That is, when the auxiliary widthwise-end mask member 85 (87) is brought closer to the transportation center line L than the widthwise-end mask members 84 (86) as shown in FIGS. 3 and 6, the auxiliary widthwise-end mask member 85 (87) partially enters one of the widthwise ends of the printing area in the printing section 12 so as to form a framed image. Conversely, when the auxiliary widthwise-end mask member 85 (87) is moved away from the transportation center line L beyond the widthwise-end mask member 84 (86) and the transportation center line L as shown in FIG. 7, the printing area is defined by the widthwise-end masks members 84 and 86 so as to form a non-framed image.

As shown in FIG. 3, a tension spring 127 is stretched between the link member 127 and the lower-level portion 63B so that the link member 127 is urged in the counterclockwise direction.

The auxiliary widthwise-end mask member 87 disposed at the opposite side relative to the transportation center line L is supported on the widthwise-end mask member 86 in the same manner so as to have the same function. Also, components of this mechanism are the same as those related to the auxiliary widthwise-end mask member 87 and are indicated by the same reference characters.

Figure 8:
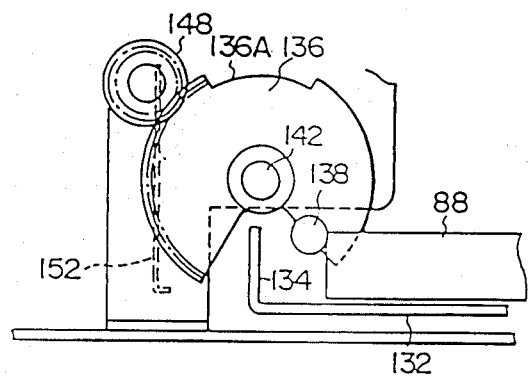
FIG. 8 is a side view of a mechanism for driving a longitudinal-end auxiliary mask member as viewed from the bottom of FIG. 6.
Figure 9:
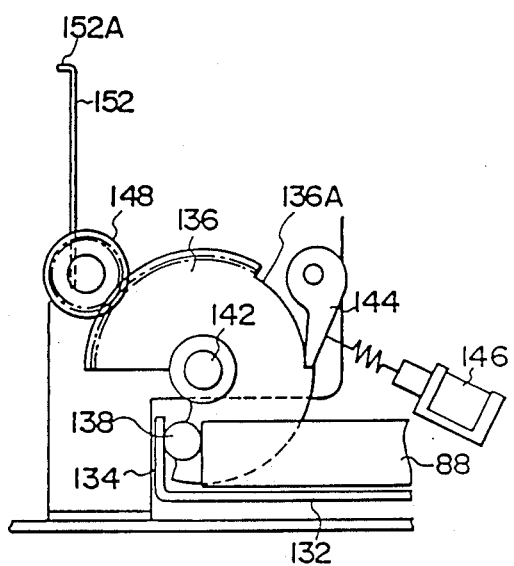
FIG. 9 is an illustration of the operation of the parts shown in FIG. 8.

The other ends of the link members 120 and 122 are axially supported by pins 128 and 130 on intermediate link members 132 which have vertically bent portions 134 formed at their ends located downstream relative to the direction in which the print paper 10 is transported. Each vertically bent portion 134 faces a pin 138 which projects from each of a pair of gears 136, as shown in FIGS. 8 and 9. The pair of gears 136 are positioned in correspondence with the auxiliary widthwise-end mask members 85 and 87 and are disposed coaxially with each other with the transportation center line L disposed therebetween. Each of the gears 136 is fixed to a support shaft 142 which is axially supported by an L-shaped member on the support plate 62.

As shown in FIG. 8, one of the pins 138 contacts the end of the moving block 88 and is thereby rotated in the clockwise direction, as the moving block 88 approaches the cutter 72. The pins 138 are thereby made to move the vertically bent portions 134 to the left, as shown in FIG. 9, so as to rotate the link members 120 and 122 about the pins 116 and 118 in the clockwise direction as viewed in FIG. 6, thereby making the auxiliary widthwise-end mask members 85 and 87 move away from the transportation center line L to retreat positions, as shown in FIG. 7.

The gears 136 can be retained by latches 144, as shown in FIG. 9, after the pins 138 have been moved by the moving block 88 from the state shown in FIG. 8 to the state shown in FIG. 9. That is, a cut portion 136 A is formed on the outer periphery of each gear 136, and the gear 136 is stopped from rotating in the counterclockwise direction as viewed in FIG. 9 when the latch 144 is brought into engagement with the cut portion 136A by an urging force of a resilient member.

A solenoid is provided for each of the latches 144. When the solenoid is energized, the latch 144 is drawn out from the cut portion 136A, thereby enabling the gear 136 to rotate in the counterclockwise direction as viewed in FIG. 9.

Pinions 148 are engaged with the outer peripheries of the gears 136. The pinions 148 are fixed to the far ends of a rotary shaft 150 and are adapted to rotate the gears 136 in synchronism with each other on the opposite sides of the transportation center line L. The rotary shaft 150 is disposed such that its longitudinal axis is perpendicular to the transportation center line L, and the rotary shaft 150 is axially supported on the reinforcement portions 63C in a position corresponding to an upper portion of the cutter 72. One end of longitudinal-end auxiliary mask member 152 is fixed to an intermediate portion of the rotary shaft 150. A bent portion 152A is formed at the other end of this longitudinal-end mask member 152.

The longitudinal-end mask member 52 is made to rotate in the clockwise direction as viewed in FIG. 9 to the state shown in FIG. 8, and it stops by contacting the cutter 72. In this state, the bent portion 152A slightly projects into the range of the printing optical axis P from the longitudinal end of the printing area defined by the moving blade 76, and is thus adapted for the printing of a framed image. However, if the widthwise-end mask members 84 and 86 are moved to the retreat positions by the movement of the moving block 88 together with the longitudinal-end mask member 82, as shown in FIG. 7, the rotary shaft 150, which receives the rotation of the gears 136 through the pinions 148, makes the longitudinal-end auxiliary mask member 152 turn to the position shown in FIG. 9 and retreat out of the range of the printing light.

Next, the character-print section 14 disposed at the rear of the printing section 12 will be described. In the character-print section 14, an upper guide plate 158 and a lower guide plate 160 are disposed so as to be close to the cutter 72, the print paper 10 transported forward from the cutter 72 after being cut by the cutter 72 is guided by these guide plates in the horizontal direction.

The upper and lower guide plates 158 and 160 have cutout areas through which upper guide rollers 166 and lower guide plate 168 project to the print paper transportation path so as to pinch and transport the print paper 10 to shading rollers 170 and 172. The upper and lower guide rollers 166 and 168 rotate when they receive a rotational force of a driving means (not shown). The upper guide rollers 166 are supported on arms 176 axially supported by pins 174 and can move upward together with the arms 176 to open the print paper transportation path when it is necessary to open it.

A character printing head 180 is disposed between the pair of lower guide rollers 168 in such a manner that it can project through an aperture formed in the lower guide plate 160 to the reverse surface of the print paper 10. The character printing head 180 is pressed against the reverse surface of the print paper 10 by a driving force of a driving means (not shown) so as to print a desired information provided as characters.

It is preferable for the lower guide rollers 168 to receive a driving force supplied from the development device (not shown) and rotate at a speed equal to that at which the print paper 10 is transported by the development device.

The shading rollers 170 and 172 are of a freely rotatable type and adapted to pinch and guide the print paper 10 to the development device in the next development process (not shown).

The operation in accordance with this embodiment will now be described below.

A continuous lengthwise sheet of print paper 10 which has been supplied from the preceding process is transported in the longitudinal direction through the gaps between the longitudinal guide blocks 20 and the guide plate 22 to a position above the support plate 62 while being pinched by the guide roller 24 and the transporting rollers 26 and 28.

In the printing section 12, the horizontal guide blocks 42 are previously moved so as to determine the positions of the widthwise-end mask members 84 and 86 in correspondence with the size of the image to be printed. In this state, the auxiliary widthwise-end mask members 85 and 87 are projecting toward the printing optical axis P, as illustrated in FIG. 6. Therefore, the surface (printing surface) of the supplied print paper 10 between widthwise end portions thereof is moved along the transporting center line L while the widthwise end portions are passing through the gaps between the auxiliary widthwise-end mask members 85 and 87 and the support plate 62. It is therefore preferable to reduce the thickness of each of the widthwise-end mask members 84 and 86 and dispose them in such a manner as to enable the auxiliary widthwise-end mask members 85 and 87 to become close to the support plate 62.

When the leading end of the print paper 10 reaches the cutter 72, the moving blade 76 is moved down and is engaged with the stationary blade 74, thereby cutting an unnecessary end portion of the print paper 10.

In this state, the longitudinal-end auxiliary mask member 152 has been moved downward toward the print paper 10 so that the bent portion 152A faces the print paper 10, as shown in FIG. 6, thereby enabling printing of a framed image.

Correspondingly, the position of the longitudinal-end mask member 82 is determined by moving the moving block 88 away from the longitudinal-end auxiliary mask member 152 to a position corresponding to the longitudinal dimension of the printing area in which the framed image is formed. Similarly, the optical means 66 is moved to a middle point as between the auxiliary mask member 152 and the mask member 82, thereby determining the optical axis P.

The print paper 10 is then exposed to printing light passing along the optical axis, thereby printing the image on a negative film.

After printing, the print paper 10 is driven by the guide roller 24, the transporting rollers 26 and 28 so that it moves to the left as viewed in FIG. 1 by a distance corresponding to the longitudinal dimension of the printed image, and the next image is thereafter printed. At the same time, the cutter 72 operates to cut the print paper 10 at a position between these adjacent printed images. After cutting, desired information provided as characters is printed on the reverse surface of the print paper 10, and the print paper 10 is thereafter transported to the development device.

To form a non-framed image, the moving block 88 is moved toward the cutter 72. The moving block 88 moves from the state shown in FIG. 8 to the state shown in FIG. 9 and makes the pin 138 rotate the gears 136. The vertically bent portions 134 thereby make the intermediate link members 132 move from the state shown in FIG. 6 to the state shown in FIG. 7, and the link members 120 and 122 rotate about the pins 116 and 118, so that the auxiliary widthwise-end mask members 85 and 87 move away from the printing optical axis P beyond the widthwise-end mask members 84 and 86, that is, retreat from the printing aperture.

At this time, the latches 144 engage with the cut portions 136A of the gears 136, thereby maintaining the position of the gears 136 at which the rotation of the gears 136 has been completed. The rotary shaft 150, that receives the rotation of the gears 136 through the pinions 148, makes the longitudinal-end auxiliary mask member 152 turn from the position indicated in FIG. 8 to that indicated in FIG. 9, so that the auxiliary mask member 152 retreats from the printing range of the optical means 66.

The longitudinal-end mask member 82 is then moved away from the cutter 72 to a position corresponding to the lengthwise dimension of the image to be printed, as the moving block 88 moves along the guide bar 92 in the direction opposite to that in which the print paper is transported. The optical means 66 is moved to a position corresponding to a middle point of this longitudinal printing dimension.

The negative image is printed by the optical means 66 over the entire widthwise dimension of the print paper 10, thereby forming a non-framed image on the print paper 10.

Selection of framed and non-framed images is performed in this manner. If the width of the print paper 10 is changed as desired, the widthwise-end mask members 84 and 86 are moved toward or away from each other together with the horizontal guide blocks 42 by the drive of the motor 54 so as to follow the widthwise ends of the print paper 10.

In the above-described embodiment, if the longitudinal-end auxiliary mask member 152 is disposed at the cutter 72, the longitudinal-end mask member 82 is further moved by a distance corresponding to the dimension of the bent portion 152 in the direction of paper transportation so as to enable printing of framed or non-framed images.

Before the assembly of the device, the widthwise-end mask member 84 (86) and the auxiliary widthwise-end mask member 85 (87) may be preliminarily combined with each other with accuracy by means of the links 120 and 122 and other members and thereafter mounted on the moving bases 112 (114). This method ensures an improvement in the accuracy of printing of a framed image.

As described above, the present invention provides a masking device which is interposed between a photographic printing light source and a photosensitive medium and is adapted to determine the printing area, and which has a pair of moving bases movable in the widthwise direction of the photosensitive medium, and mask members respectively disposed on the moving bases and capable of slightly advancing or retreating so as to correspond to the size of a framed or non-framed image. This masking device can be adjusted depending on the selection of framed and non-framed images.

What is claimed is:

1. A masking device for use in photographic printing, disposed between a photographic printing light source and a lengthwise sheet of photosensitive medium and adapted to define the area of printing on said photosensitive medium, said masking device comprising:
   a pair of moving bases capable of moving in a first direction generally perpendicular to a second direction corresponding to the lengthwise direction of said photosensitive medium, said moving bases being capable of moving toward or away from each other;
   first mask members fixed to said pair of moving bases and moved together therewith so as to define the printing area in said first direction at the time of non-framed image printing over the entire area of said photosensitive medium; and
   auxiliary mask members mounted on said first mask members and projected therefrom so as to define the printing area in said first direction, said printing area being reduced so that a peripheral portion of said photosensitive medium is not subjected to printing when said auxiliary mask members are projected.

2. A masking device according to claim 1, wherein said first mask members and said auxiliary mask members are preliminarily assembled so that they are integrally assembled on said moving bases.

3. A masking device according to claim 1, further comprising parallel-movement mechanisms disposed between said first mask members and said auxiliary mask members and adapted to enable said projection of said auxiliary mask members while maintaining a certain degree of parallelism of said auxiliary mask members with said second direction.

4. A masking device according to claim 3, further comprising a cutter constituting a second mask member defining one of opposite ends of said printing area in said second direction, said cutter being adapted to cut said photosensitive medium in said first direction after printing.

5. A masking device according to claim 4, further comprising a third mask member capable of moving in said second direction and adapted to define the other end of said printing area in said second direction.

6. A masking device according to claim 5, further comprising first link means for moving said parallel-movement mechanisms in response to a movement of said third mask member.

7. A masking device according to claim 6, wherein said first link means makes said parallel-movement mechanisms operate when said third mask member is moved to a predetermined position so as to reduce said printing area.

8. A masking device according to claim 7, further comprising a fourth mask member capable of entering said printing area so as to reduce said printing area in said second direction and define said one of said opposite ends of said printing area.

9. A masking device according to claim 8, further comprising second link means for moving said fourth mask member from the inside of said printing area to the outside thereof when said third mask member is moved to a predetermined position so as to reduce said printing area.

10. A masking device for use in photographic printing, disposed between a lengthwise sheet of photosensitive medium and a light source for performing printing of an image on said sheet of photosensitive medium, and adapted to define the area of printing on said sheet at said time of printing of said image on said sheet, said masking device comprising:
    a pair of moving bases capable of moving toward or away from each other in the widthwise direction of said sheet;
    a pair of widthwise-end mask members fixed to said pair of moving bases and moved together therewith so as to define the printing area in said widthwise direction at said time of non-framed image printing over the entire area of said photosensitive medium;
    a pair of auxiliary mask members mounted on said first mask members and projected therefrom so as to define the printing area in said widthwise direction, said printing area being reduced so that a peripheral portion of said photosensitive medium is not subjected to printing when said auxiliary mask members are projected;
    a cutter constituting a first longitudinal-end mask member defining one of opposite ends of said printing area in the lengthwise direction of said sheet, said cutter being adapted to cut said sheet in said widthwise direction after printing; and
    a second longitudinal-end mask member capable of moving so as to reduce said printing area in said lengthwise direction of said sheet and adapted to define the other end of said printing area in said lengthwise direction of said sheet.

11. A masking device according to claim 10, wherein said widthwise-end mask members and said auxiliary mask members are preliminarily assembled so that they are integrally assembled on said moving bases.

12. A masking device according to claim 10, further comprising parallel-movement mechanisms disposed between said widthwise-end mask members and said auxiliary mask members and adapted to move said auxiliary mask members so as to reduce said printing area in said widthwise direction while maintaining the parallelism of said auxiliary mask members with said widthwise-end mask members.

13. A masking device according to claim 12, further comprising urging means for constantly urging said parallel-movement mechanisms so as to make said pair of widthwise-end mask members reduce said printing area in said widthwise direction.

14. A masking device according to claim 13, further comprising link means for making said parallel-movement mechanisms operate against the urging force of said urging means in response to said movement of said second longitudinal-end mask member toward said cutter so that said widthwise-end mask members increase said printing area in said widthwise direction.

15. A masking device according to claim 14, further comprising retaining means for maintaining the operating state of said link means against said urging force so as to maintain the distanced state of said pair of widthwise-end mask members.

16. A masking device according to claim 15, further comprising a second auxiliary mask member capable of entering said printing area so as to reduce said printing area in said longitudinal direction of said sheet and define said one of said opposite ends of said printing are in said longitudinal direction of said sheet.

17. A masking device according to claim 16, further comprising moving means for moving said second auxiliary mask member out of said printing area when said second longitudinal-end mask member is moved so as to reduce said printing area.

* * * * *